United States Patent [19]

Chong

[11] 4,360,540

[45] Nov. 23, 1982

[54] RADIATION CURABLE COMPOSITIONS CONTAINING CYANOALKOXYALKYL AND CYANOTHIAALKYLALKYL ACRYLATES

[75] Inventor: Joshua A. Chong, Willow Grove, Pa.

[73] Assignee: Rohm and Haas Company, Philadelphia, Pa.

[21] Appl. No.: 222,783

[22] Filed: Dec. 30, 1980

[51] Int. Cl.³ .............................................. B05D 3/06
[52] U.S. Cl. ...................................... 427/44; 156/326; 156/330; 156/332; 204/159.15; 204/159.22; 204/159.23; 260/465.4; 427/54.1; 428/413; 428/423.1; 428/480; 525/43; 525/529; 526/298
[58] Field of Search ................... 526/298, 297; 427/44, 427/208.4; 525/54 L, 43, 529; 204/159.14, 159.15, 159.16, 159.22, 159.23, 159.24; 156/326, 330.9, 331.4, 331.8, 332; 260/465.4; 428/413, 418, 423.1, 425.1, 480, 481

[56] References Cited

U.S. PATENT DOCUMENTS

| 2,720,512 | 10/1975 | Butler | 260/88.7 |
|---|---|---|---|
| 3,445,403 | 5/1969 | Tucker et al. | 526/298 X |
| 3,551,235 | 12/1970 | Bassemir et al. | 156/99 |
| 3,551,246 | 12/1970 | Bassemir et al. | 156/272 |
| 3,551,311 | 12/1970 | Nass et al. | 204/159.18 |
| 3,552,986 | 1/1971 | Bassemir et al. | 117/12 |
| 3,558,387 | 1/1971 | Bassemir et al. | 156/99 |
| 3,650,669 | 3/1972 | Osborn et al. | 8/115.5 |
| 3,661,614 | 5/1972 | Bassemir et al. | 117/38 |
| 3,772,062 | 11/1973 | Shur et al. | 117/93.31 |
| 3,783,006 | 1/1974 | Hahn et al. | 117/93.31 |
| 4,097,677 | 6/1978 | Emmons et al. | 560/220 |
| 4,128,536 | 12/1978 | Brodsky et al. | 427/54.1 |
| 4,148,987 | 4/1979 | Winey | 526/316 |
| 4,154,914 | 5/1979 | Kuraya | 526/298 X |
| 4,265,976 | 5/1981 | Nowak | 427/54.1 X |

FOREIGN PATENT DOCUMENTS 50-09668 1/1975 Japan .
50-52190 5/1975 Japan .

Primary Examiner—Michael R. Lusignan
Assistant Examiner—Thurman K. Page
Attorney, Agent, or Firm—Lester E. Johnson

[57] ABSTRACT

There are disclosed radiation curable compositions containing (a) about 5-95% by weight of at least one cyanoalkoxyalkyl or cyanothiaalkylalkyl acrylate, (b) about 1-90% by weight of a photopolymerizable acrylated polymer or oil, and (c) from 0 to about 5% by weight of a photoinitiator. The compositions are useful as 100% solids coatings and adhesives compositions which are curable upon exposure to radiation, and which are useful in a variety of applications such as for coating textiles and fabrics, for producing pressure sensitive adhesives, and for producing laminating adhesives.

7 Claims, No Drawings

RADIATION CURABLE COMPOSITIONS CONTAINING CYANOALKOXYALKYL AND CYANOTHIAALKYLALKYL ACRYLATES

CROSS-REFERENCE TO RELATED APPLICATION

This patent application is related to the simultaneously-filed patent application Ser. No. 222,784 of William D. Emmons, Donald A. Winey, and Nicholas A. Rounds entitled "Radiation Curable Compositions Containing β-Cyanoethoxyalkyl Acrylates" in the hands of a common assignee.

BACKGROUND OF THE INVENTION

This invention relates to radiation curable 100% solids coatings and adhesives compositions containing cyanoalkoxyalkyl and cyanothiaalkylalkyl acrylates as a non-volatile, non-toxic and highly polar reactive monomer (reactive diluent).

It is well known in the art to deposit polymerizable liquid coatings on substrates and then to dry and cure such coatings by passing them through ovens to crosslink the coatings. It is also known in the art to use coatings which are curable by exposure to actinic radiation such as ultraviolet rays or that from plasma arc radiation sources, as well as by exposure to high energy ionizing radiation such as electron beam radiation. These systems have disadvantages in that either ovens are required or that, in radiation curable coatings, oxygen inhibition of the polymerization of the coating may occur, or it may be necessary to employ solvents to decrease the viscosity of the coating for application purposes.

Due to energy and raw material shortages, increasingly strict air pollution standards and safety regulations, the search is continuing for 100% polymerizable systems, i.e., compositions which have no highly volatile components but which contain reactive viscosity reducing diluents which become either the sole cured film or part of the cured film. Such types of compositions are known, for example, multifunctional acrylates, methacrylates and itaconates of pentaerythritol, dipentaerythritol and polypentaerythritols and others disclosed in U.S. Pat. Nos. 3,551,235; 3,551,246; 3,551,311; 3,552,986; 3,558,387; and 3,661,614.

Two U.S. patents which disclose radiation cure of monofunctional acrylates are U.S. Pat. No. 3,783,006 which describes a wide number of acrylate monomers for use as diluents in polymer syrups which are cured on metal containers via electron beam radiation and U.S. Pat. No. 3,772,062 which also describes the use of various diluents in the curable coatings.

U.S. Pat. No. 4,097,677 discloses dicyclopentenyloxyalkyl (meth)acrylates and compositions thereof that can be cured by exposure to radiation.

U.S. Pat. No. 4,148,987 discloses monoethylenically unsaturated derivatives of vinylbenzyl-substituted benzophenones or acetophenones, and homopolymers and copolymers thereof that can be cured by exposure to radiation.

U.S. Pat. No. 3,650,669 discloses a method for the polymerization of a variety of monomers and for the crosslinking of polymers by exposing the monomers or the polymers to radiation. Column 6, lines 34–50 disclose the curing or crosslinking of 100% solids coating compositions containing a polymer with a reactive monomer, particularly polyesters containing the norbornenyl group with certain high boiling acrylyl esters, among which esters there is mentioned at column 11, line 56 "cyanoalkyl" esters of (meth)acrylic acid wherein the alkyl group contains up to 15 carbon atoms.

Monomers which are suitable for cure by exposure to radiation (i.e. ultraviolet light or electron beam radiation) require a wide range of properties, such as low-volatility, rapid polymerization rate, low toxicity, and low odor. Additionally, radiation curable compositions frequently contain dissolved polymers or oligomers so that the ability of the monomers to solubilize polymers with substantial reduction in viscosity becomes important. Since the monomer portion of all these compositions contacts the substrates its properties influence adhesion, flow, wetting, and so on. In textile applications it is necessary that the monomer be polar enough to yield a polymer with substantial resistance to swelling in drycleaning solvents.

The dicyclopentenyloxyalkyl (meth)acrylates yield polymers characterized by high glass transition temperatures and are well suited for paints and similar coatings on rigid substrates.

Other low volatility acrylate monomers, such as the polyol polyacrylates, are available; however, these cure to highly crosslinked and extremely hard, brittle films. Higher alkyl acrylates such as lauryl acrylate have the desired lower volatility and viscosity but their use alone as a diluent tends to promote excessive softening. Use of such higher alkyl acrylates with the dicyclopentenyloxyalkyl (meth)acrylates provides a satisfactory degree of latitude of hardness and flexibility and viscosity control not heretofore obtainable.

There is still a need for radiation curable monomers which give low glass transition temperature (Tg), flexible, and polar polymers. Butyl acrylate and 2-ethylhexyl acrylate are too volatile for general use. The higher alkyl acrylates give slower cures, are relatively non-polar, and are poor solvents for the oligomers and polymers used. The hydroxyl functional acrylates, e.g. hydroxyethyl acrylate, although having good solvency and resistance properties, are toxic and cause serious skin irritation. Similarly, ethoxyethyl acrylate is a skin irritant.

The β-cyanoethoxyalky acrylates of the patent application of Emmons, Winey and Rounds filed simultaneously herewith provide a class of radiation curable reactive monomers possessing a desirable balance of high polarity, low volatility, and rapid polymerization rate. However, these monomers are made using acrylonitrile, a material reported to possess toxic and mutagenic properties. In the trans-esterification reaction of the intermediate cyanoethoxyalkanol with the acrylic acid ester, the intermediate can decompose from a non-toxic material to the toxic starting material, acrylonitrile, increasing the hazards associated with the use of acrylonitrile.

DESCRIPTION OF THE INVENTION

It is an object of the invention to provide a non-toxic, non-volatile, highly polar, radiation curable reactive monomer.

Another object is to provide a 100% reactive radiation curable composition containing a reactive monomer which will provide a flexible, polar polymer upon cure possessing low Tg properties and a desirable balance of other properties.

Still another object is to provide a method of coating a flexible substrate using the 100% reactive radiation curable composition containing the reactive monomer of the invention.

Yet another object is to provide a substrate having a radiation cured composition applied to at least one surface thereof.

These and other objects as will become apparent are achieved by the present invention which comprises a radiation curable reactive monomer having the formula $$H_2C=CH-C(O)-O-R-X-CH(R^1)-CH(R^2)-CN$$

wherein R is a ($C_2$–$C_5$) alkylene group or a ($C_2$–$C_5$) oxaalkylene or thiaalkylene group having discrete alkylene segments containing at least two carbon atoms joined by the O or S atom; $R^1$ and $R^2$, independently, a straight-chain or branched-chain ($C_2$–$C_5$) alkyl group; and X is O or S.

In another aspect, the invention comprises a radiation curable composition comprising (a) about 5–95% by weight, based on total composition, of at least one reactive monomer having the formula $$H_2C=CH-C(O)-O-R-X-CH(R^1)-CH(R^2)-CN$$

defined above;

(b) about 1–90% by weight, based on total composition, of a radiation curable acrylated polymer or oil; and (c) from 0 up to about 5% by weight, based on total composition, of a photoinitiator.

In still another aspect, the invention comprises a method of coating a substrate which comprises applying to the substrate a composition according to the invention and curing or drying the coated substrate by exposing the coated substrate to radiation.

In yet another aspect, the invention comprises an articl of manufacture comprising a substrate having applied thereto a radiation cured coating comprising the composition according to the invention.

Certain members of the class of reactive monomers, β-cyanoethoxyalkyl (meth)acrylates, and their use to form polymers, are known. However, use of these monomers as reactive monomers in radiation curable compositions is not known.

Japanese Patent Kokai 75 09,688, Jan. 31, 1975, reported in Chem. Abs. 83: 28832k (1975) and Derwent Abs. 29607 W/18 A14, describes the preparation of terpolymers containing, for example, acrylonitrile, styrene, and 2-(2-cyanoethoxy)ethyl methacrylate, the terpolymers being useful in the hot press production of sheets.

Japanese Patent Kokai 75 52,190, May 9, 1975, reported in Chem. Abs. 83:115776p (1975), describes impact-resistant acrylonitrile resins prepared by grafting a nitrile monomer and a nitrile-containing unsaturated carboxylic ester, for example, 2-(2-cyanoethoxy)ethyl methacrylate, and optionally a vinyl aromatic compound, onto a diene-nitrile rubber.

U.S. Pat. No. 2,720,512, Oct. 11, 1975, discloses 3-(2-cyanoethoxy)propyl or 4-(2-cyanoethoxy)butyl acrylates useful, with other compounds having the vinyl $H_2C=CH-$ radical, for producing polymers and copolymers which may be vulcanized to give rubbery products useful in the fabrication of molded products.

The reactive monomers, also known in the art as reactive diluents, useful in the present invention have the formula $$H_2C=CH-C(O)-O-R-X-CH(R^1)-CH(R^2)-CN$$

wherein R is a ($C_2$–$C_5$) alkylene group or a ($C_2$–$C_5$) oxaalkylene or thiaalkylene group having discrete segments containing at least two carbon atoms joined by the O or S atom; $R^1$ and $R^2$ are, independently, a straight-chain or branched-chain ($C_2$–$C_5$) alkyl group; and X is O or S. Preferably, R is an alkylene group, especially —$CH_2CH_2CH(CH_3)$—; $R^1$ is $CH_3$ or $C_2H_5$, especially $C_2H_5$; $R^2$ is H or $CH_3$, especially H; and X is O. This reactive monomer is used in the composition of the invention in the range of amount of 5–95%, preferably 20–50%, by weight, based on total composition.

The second required component of the radiation curable composition of the invention is a radiation curable acrylated polymer or oil selected from acrylated epoxidized drying-type oils; acrylic oligomers; acrylated bis-phenol A/epoxy resins; acrylated urethane prepolymers (acrylated polyurethanes) produced from the condensate of a polyol, a polyisocyanate, and a hydroxyalkyl acrylate; and unsaturated polyester resins. This component is used in the composition of the invention in the range of amount of 1–90%, preferably 35–55%, by weight, based on total composition.

Other acrylic monomers may be used, in minor amounts, with the required reactive monomer component of the invention as a replacement for a portion thereof. Typical other acrylic monomers include, for example, monoacrylates, such as methyl acrylate, cyclopentyl acrylate, 2-ethylhexyl acrylate, hydroxyethyl acrylate and the like; diacrylates such as ethylene glycol diacrylate, triethylene glycol diacrylate, neopentyl glycol diacrylate, 1,4-butanediol diacrylate and the like; triacrylates such as trimethylol propane triacrylate and the like or tetraacrylates such as pentaerythritol tetraacrylate and the like. Also, other monomers containing photosensitive groups, for example, vinylbenzyl benzoylbenzoate and allyl benzoylbenzoate and derivatives thereof, may be used in minor amounts to replace a portion of the required reactive monomer component.

The compositions of this invention are cured or dried by exposure to radiation. The compositions are curable by exposure to ultraviolet light, i.e. to radiation having a wavelength about 2000 to 5000 Å, for a period of time which is sufficient to accomplish the desired amount of cure or crosslinking and yet which will not result in any undesirable degradation of the copolymer, said degradation being in the form of oxidation and/or polymer chain cleavage and beign manifested by discoloration and a marked deterioration in the physical properties of the copolymer composition. The length of exposure will also be dependent on the source of radiation as well as on the distance between the source and the copolymer sample. In addition, electron beams, gamma radiation emitters and the like can be employed instead of ultraviolet light. Suitable sources of radiation include carbon arcs, mercury-vapor arcs, fluorescent lamps with ultraviolet light emitting phosphors, argon glow lamps, photographic flood lamps, Van der Graaf accelerators, resonant transformers, betatron linear accelerators, gamma radiation emitters and combinations thereof.

Generally, a photoinitiator or sensitizer is added to the composition before exposing the coatings to ultraviolet light. When used, the photoinitiators are used in the amount of about 0.1–15% by weight, preferably about 1–5% by weight, based on total composition. Preferred photoinitiators include selected acyloins or derivatives thereof, for example, benzoin alkyl ethers such as benzoin methyl ether; desyl halides such as desyl bromide or chloride; desyl amine; phenone compounds such as benzophenone and acetophenone and derivatives thereof; polychlorinated aromatic compounds; and a combination of organic carbonyls and amines or mixtures thereof. Suitable acetophenone photoinitiators are disclosed in U.S. Pat. No. 3,715,293 and the combination of organic carbonyls and amines is disclosed in U.S. Pat. No. 3,759,807.

The radiation curable compositions of this invention are useful as coatings and adhesives, especially for flexible substrates. Suitable substrates include textiles and fabrics, paper, and flexible plastic films and articles such as disposable cups and bottles, and also thin metallic sheets or foils. The compositions can be used as laminating adhesives or pressure sensitive adhesives; coatings, pigmented or unpigmented, for paper; coatings or binderes for textiles, natural or synthetic, or in vehicles for textile printing inks or for specialized treatments of fabrics to produce water repellency or resistance to chemical stains and other uses which would be apparent to those in the art to which the invention relates.

The compositions of this invention are generally used as films having a thickness of about 0.1–30 mils, and preferably about 0.2–10 mils.

In the following examples which are illustrative of the invention, the parts and percentages are by weight and the temperatures are Centigrade unless otherwise indicated.

EXAMPLE 1

Preparation of 3-cyanomethyl-4-oxaoct-7-yl propenoate

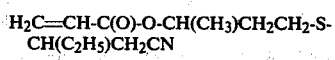

In a 1-l. four-necked flask fitted with a mechanical stirrer, a reflux concenser, a thermometer and a dropping funnel is placed 1,3-butanol (180 g, 2 moles). The system is then blanketed with nitrogen and potassium t-butoxide (10 g, 89 mmoles) is added. The mixture is heated by means of an oil bath to about 75° C. and then 1-butene-1-carbonitrile (162 g, 2 moles) is added dropwise over 3–4 hrs. Heating is continued for 18 hrs. After cooling the reaction mixture, it is transferred to a separatory funnel dissolved in 500 ml of methylene chloride. The organic solution is neutralized with 10% HCl in water, washed with water, and dried over anhydrous magnesium sulfat4e. The organic solution is filtered and concentrated on a rotary evaporator. The residue is distilled at reduced pressure to give 285 g (83%, bp 110°–114°/0.13 mm Hg) of intermediate cyanoalcohol, the structure of which is confirmed by infrared and nuclear magnetic resonance analysis.

To a flask fitted with a mechanical stirrer, a 1-ft. Vigreaux column with a distillation head, a thermometer and a tube for air sparge is placed 124 g (0.73 moles) of the above cyanoalcohol, 365 g (3.65 moles) of ethyl acrylate and 500 mg of p-methoxyphenol as an inhibitor. The mixture is heated to boiling and 10 ml of distillate is collected and discarded. Then the temperature is lowered and 2.15 g (7.5 mmoles) of tetraisopropyl titanate is added. The reaction pot temperature is maintained at about 70° while the ethyl acrylate azeotrope is collected. After 4 hrs. another 1 g of tetraisopropyl titanate is added. The progress of the reaction is monitored by VPC analysis of both the azeotrope and the reaction mixture. After a total of 6 hrs. the excess ethyl acrylate is removed at reduced pressure. To the residual oil is added 3.15 g of activated charcoal with stirring followed by 15.8 g of water. After 15 min. the oil is filtered and dried over anhydrous magnesium sulfate. The filtrate is placed under high vacuum to remove remaining ethyl acrylate. The product, 157.2 g (95.7%), is a pale yellow oil, the structure of which is confirmed by infrared and proton nuclear magnetic resonance analysis.

EXAMPLE 2

Preparation of 3-cyanomethyl-4-thiaoct-7-yl propenoate

Following the procedure of Example 1, $CH_3CH(OH)CH_2CH_2SH$ is reacted with $CH_3CH_2CH=CHCN$ and the intermediate is reacted with ethyl acrylate to give the desired product.

EXAMPLE 3

Viscosity Reduction and Coatings Preparation

The viscosity of several reactive monomer-polymer (resin) mixtures is determined. The results, shown in the table below, illustrates that the reactive monomer representative of the present invention provides advantageous efficiency in reducing the viscosity of radiation curable coatings compositions relative to a comparison reactive monomer, dicyclopentenyloxyethyl acrylate.

Photoinitiator was added to the mixtures and coatings were cured as 2 mil films by exposure to 4 lamp passes at 5 m/min of 80 watt/cm medium pressure mercury radiation. Satisfactory cured coatings were obtained.

TABLE

Viscosity Data
Haake, PKI, 8 rpm (D = 178 sec$^{-1}$)

| Resin | Monomer (%) | Dicyclopentenyl-oxyethyl Acrylate | Example 1 |
|---|---|---|---|
| Witco customer U0100 | 25 | 25,100 | 11,000 |
| | 50 | 3,500 | 2,200 |
| | 75 | 2,600 | 1,320 |
| Uvithane ® | 25 | — | 44,000 |
| | 50 | 7,040 | 4,840 |
| | 75 | 3,080 | 3,080 |
| Shell DRH-370 ® | 25 | 23,800 | 9,680 |
| | 50 | 4,800 | 4,400 |
| | 75 | 3,500 | 4,400 |

EXAMPLE 4

Coatings Preparation

Coating films of 1:1 mixtures of the reactive monomer of Example 1 with two resins, Witco U0100 ® and Uvithane 788 ®, were cured as 2 mil films by exposure to electron beam radiation (9 Mrads cure dose) to provide smooth, attractive cured films. The properties of the films are set forth in the table below.

TABLE

| | Film Properties | |
|---|---|---|
| | Witco U0100 | Uvithane 788 |
| Tensile Stress | 7 kg/cm | 23 kg/cm |
| Elongation (to break) (% original length) | 35% | 45% |

What is claimed is:

1. A radiation curable composition comprising
(a) about 5–95% by weight, based on total composition, of at least one cyanoethoxyalkyl acrylate having the formula $$H_2C=CH-C(O)-O-R-X-CH(R^1)-CH(R^2)-CN$$

wherein R is a $(C_2-C_5)$alkylene group or a $(C_2-C_5)$oxaalkylene or thiaalkylene group having discrete alkylene segments containing at least two carbon atoms joined by O or S atom; $R^1$ and $R^2$ independently, are a straight-chain or branched-chain $(C_2-C_5)$alkyl group; and X is O or S;
(b) about 1–90% by weight, based on total composition, of at least one radiation curable component selected from the group consisting of acrylated epoxidized drying-type oils, acrylic oligomers, acrylated bisphenol A/epoxy resins, acrylated urethane prepolymers, and unsaturated polyester resins; and
(c) from 0 up to about 5% by weight, based on total composition, of a photoinitiator.

2. The composition of claim 1 wherein R is $-CH_2CH_2CH(CH_3)-$; X is O or S; $R^1$ is $CH_3$; and $R^2$ is H or $CH_3$.

3. The composition of claim 1 comprising
(a) about 20–50% by weight of the reactive monomer;
(b) about 35–55% by weight of the acrylated polymer or oil; and
(c) about 1–5% by weight of a photoinitiator.

4. The composition of claim 1 wherein the radiation curable component, (b), is selected from the group consisting of acrylated bis-phenol A/epoxy resins and acrylated urethane prepolymers.

5. A method of coating a substrate which comprises applying to the substrate a composition according to claim 1 and curing or drying the coated substrate by exposing the coated substrate to radiation selected from the group consisting of ultraviolet light, electron beam and gamma radiation.

6. The method of claim 1 wherein the coated substrate is cured or dried by exposing it to electron beam radiation or ultraviolet light.

7. An article of manufacture comprising a substrate having applied thereto a radiation cured coating comprising the composition of claim 1.

* * * * *

UNITED STATES PATENT AND TRADEMARK OFFICE
CERTIFICATE OF CORRECTION

PATENT NO. : 4,360,540
DATED : November 23, 1982
INVENTOR(S) : Joshua A. Chong

It is certified that error appears in the above—identified patent and that said Letters Patent is hereby corrected as shown below:

Claim 1, column 7, line 22, between "by" and "O"
    insert -- the --.

Signed and Sealed this

First Day of February 1983

[SEAL]

Attest:

GERALD J. MOSSINGHOFF

Attesting Officer     Commissioner of Patents and Trademarks